(12) United States Patent
Misono et al.

(10) Patent No.: US 7,889,289 B2
(45) Date of Patent: Feb. 15, 2011

(54) LIQUID CRYSTAL DISPLAY DEVICE HAVING PARTICULAR PRISM SHEET

(75) Inventors: Kenji Misono, Nara (JP); Mitsuhiro Murata, Yao (JP); Shinichi Miyazaki, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 447 days.

(21) Appl. No.: 12/084,424

(22) PCT Filed: Oct. 27, 2006

(86) PCT No.: PCT/JP2006/321546

§ 371 (c)(1),
(2), (4) Date: May 1, 2008

(87) PCT Pub. No.: WO2007/052565

PCT Pub. Date: May 10, 2007

(65) Prior Publication Data

US 2009/0256997 A1    Oct. 15, 2009

(30) Foreign Application Priority Data

Nov. 4, 2005    (JP)    ............... 2005-320758

(51) Int. Cl.
*G02F 1/1335*    (2006.01)
(52) U.S. Cl. ............... 349/64; 349/61; 349/62
(58) Field of Classification Search ............ 349/64, 349/61, 62
See application file for complete search history.

(56) References Cited

U.S. PATENT DOCUMENTS

| | | | |
|---|---|---|---|
| 5,598,281 A | 1/1997 | Zimmerman et al. | |
| 5,949,933 A | 9/1999 | Steiner et al. | |
| 5,990,993 A | 11/1999 | Haas | |
| 2001/0019378 A1 | 9/2001 | Yamaguchi | |
| 2002/0196405 A1 | 12/2002 | Colgan et al. | |

(Continued)

FOREIGN PATENT DOCUMENTS

JP    61-148430    7/1986

(Continued)

OTHER PUBLICATIONS

International Search Report for PCT/JP2006/321546 mailed Nov. 21, 2006.

(Continued)

*Primary Examiner*—Mike Qi
(74) *Attorney, Agent, or Firm*—Nixon & Vanderhye, P.C.

(57) ABSTRACT

In a liquid crystal display device having a light diffuser, a desired luminance distribution is realized and displaying with a high contrast ratio across a broad angle range is performed. A liquid crystal display device according to the present invention includes a liquid crystal display panel for modulating light emitted from a light source, and a light diffuser being disposed at a viewer's side of the liquid crystal display panel. The light diffuser is a prism sheet including a plurality of prisms, each prism having: a first prism section including a first slope slanted at a first angle with respect to the display surface normal direction; and a second prism section including a second slope slanted with respect to the display surface normal direction at a second angle different from the first angle and being disposed at the viewer's side of the first prism section.

13 Claims, 16 Drawing Sheets

U.S. PATENT DOCUMENTS

| | | | |
|---|---|---|---|
| 2003/0053009 A1 | 3/2003 | Sato et al. | |
| 2003/0234900 A1 | 12/2003 | Kim | |
| 2010/0066957 A1 | 3/2010 | Miyazaki et al. | |
| 2010/0142188 A1* | 6/2010 | Ha et al. | 362/97.2 |

FOREIGN PATENT DOCUMENTS

| | | | |
|---|---|---|---|
| JP | 4-81816 | | 3/1992 |
| JP | 7-104271 | | 4/1995 |
| JP | 8-254606 | | 10/1996 |
| JP | 08254606 A | * | 10/1996 |
| JP | 8-304631 | | 11/1996 |
| JP | 9-22011 | | 1/1997 |
| JP | 9-127309 | | 5/1997 |
| JP | 10-104433 | | 4/1998 |
| JP | 11-237623 | | 8/1999 |
| JP | 2000-352711 | | 12/2000 |
| JP | 2001-125105 | | 5/2001 |
| JP | 2002-236201 | | 8/2002 |
| JP | 2006-251352 | | 9/2006 |
| JP | 2007328309 A | * | 12/2007 |
| WO | 03/071343 A1 | | 8/2003 |
| WO | WO 2006/112325 A1 | | 10/2006 |

OTHER PUBLICATIONS

English translation of the International Preliminary Report on Patentability mailed May 15, 2008 in corresponding PCT Application No. PCT/JP2006/321546.

Supplementary EP Search Report mailed Aug. 3, 2010 in EP Application 07850357.0.

* cited by examiner

FIG. 7
(a)
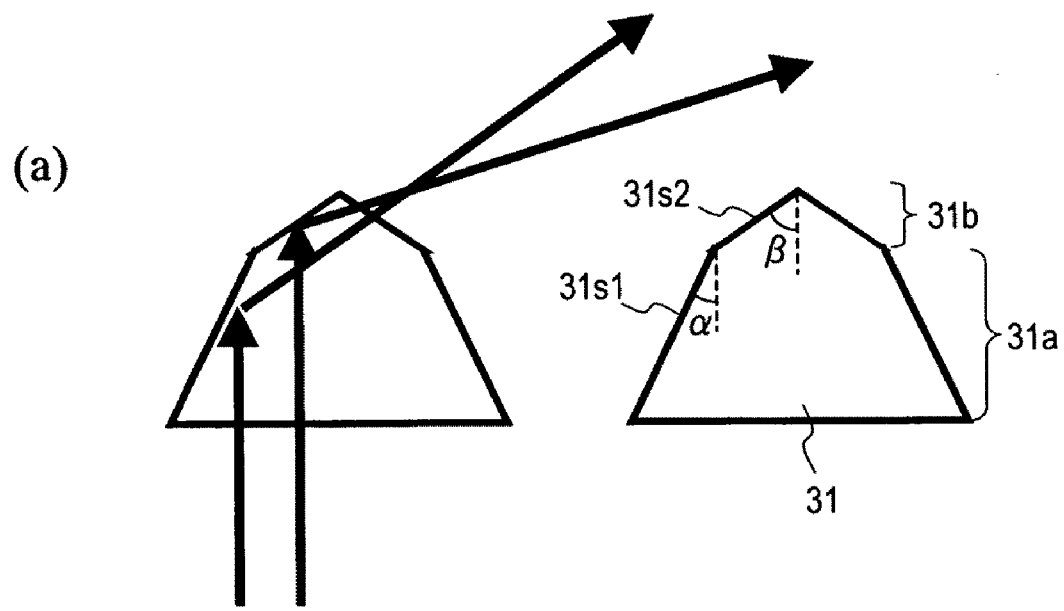
(b)
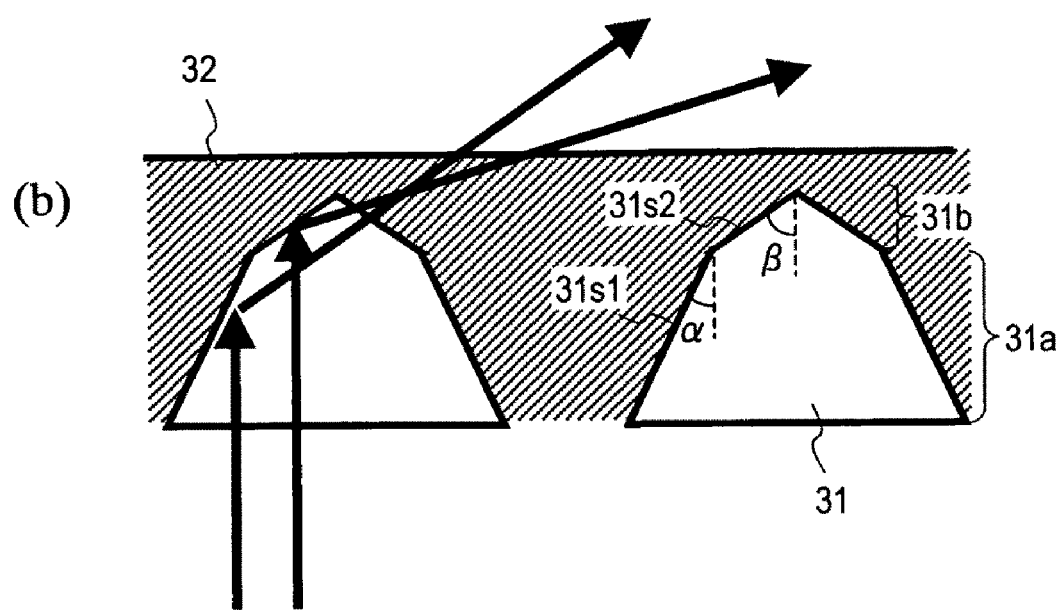

FIG.8
(a)
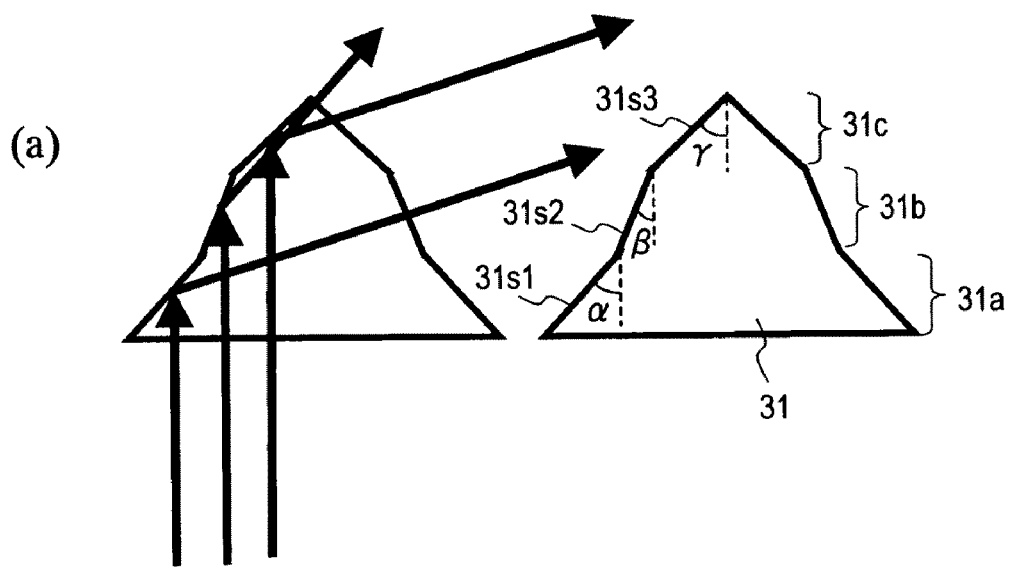
(b)
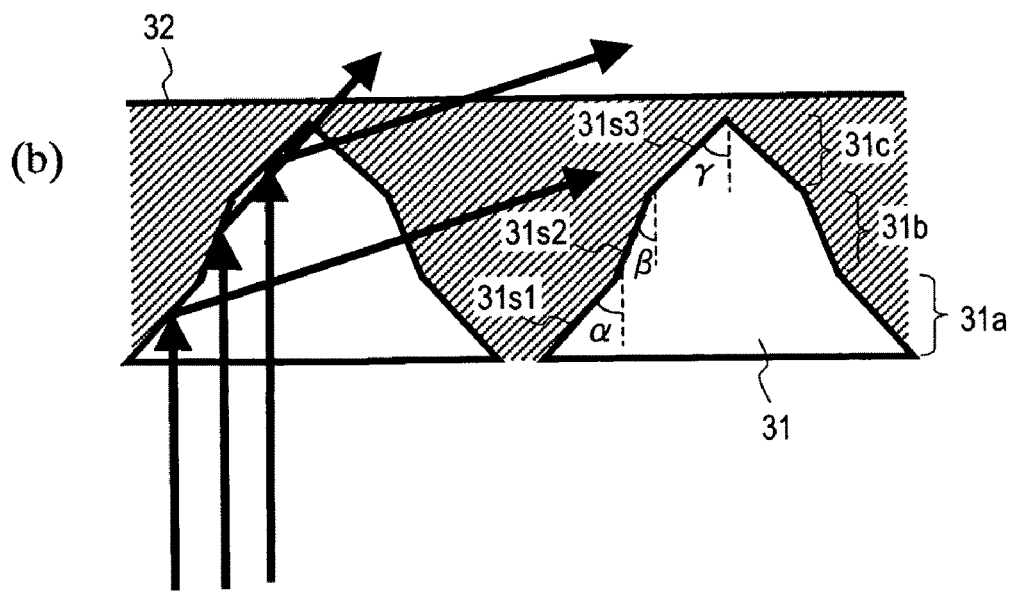

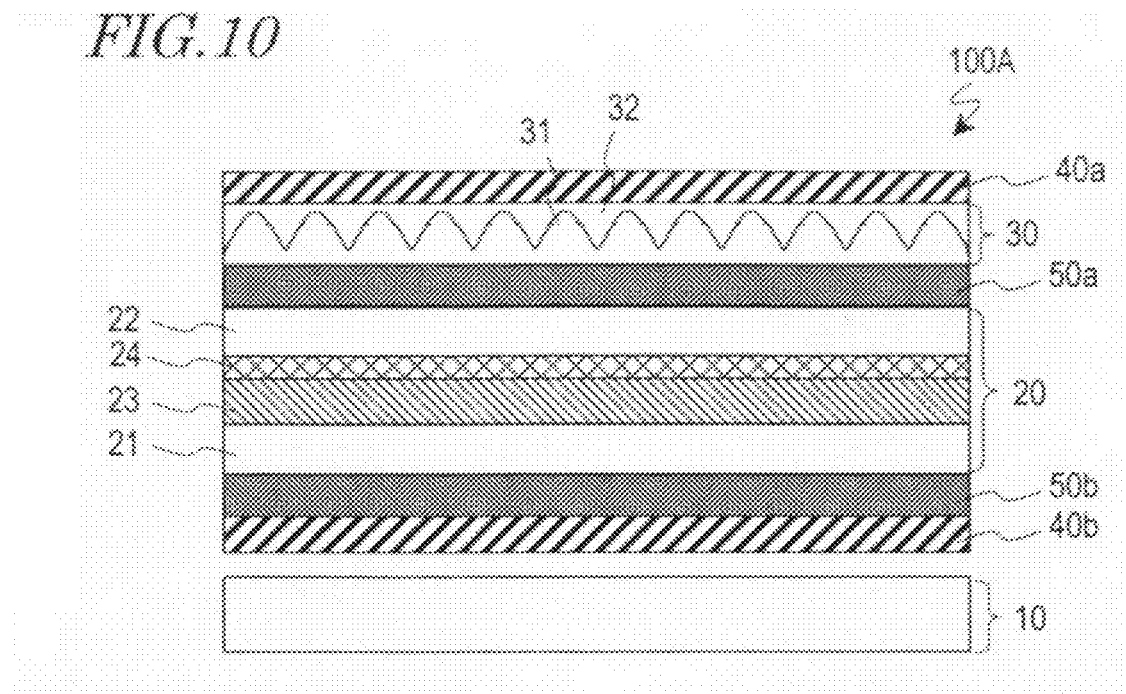
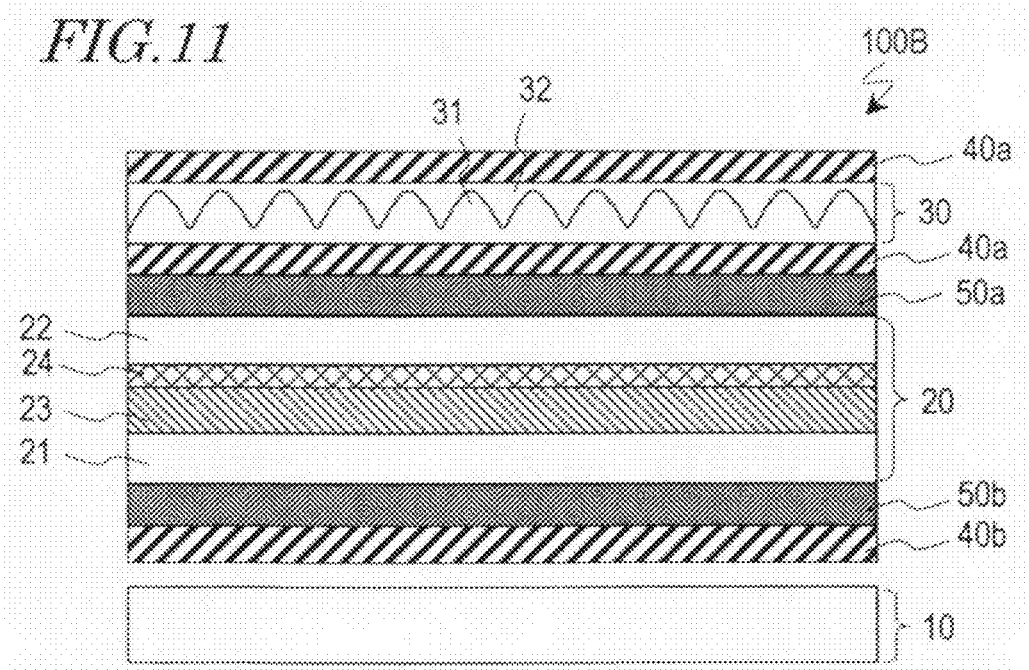

FIG.13
(a)
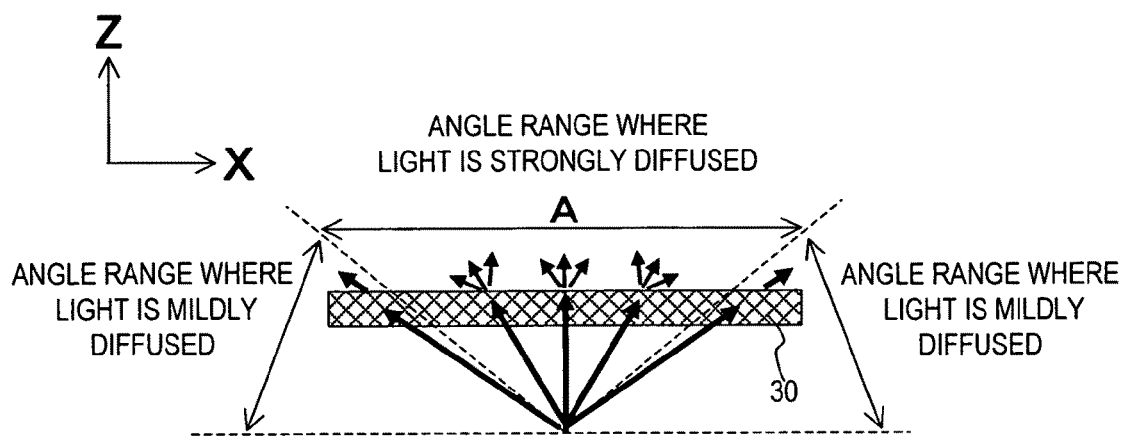
(b)
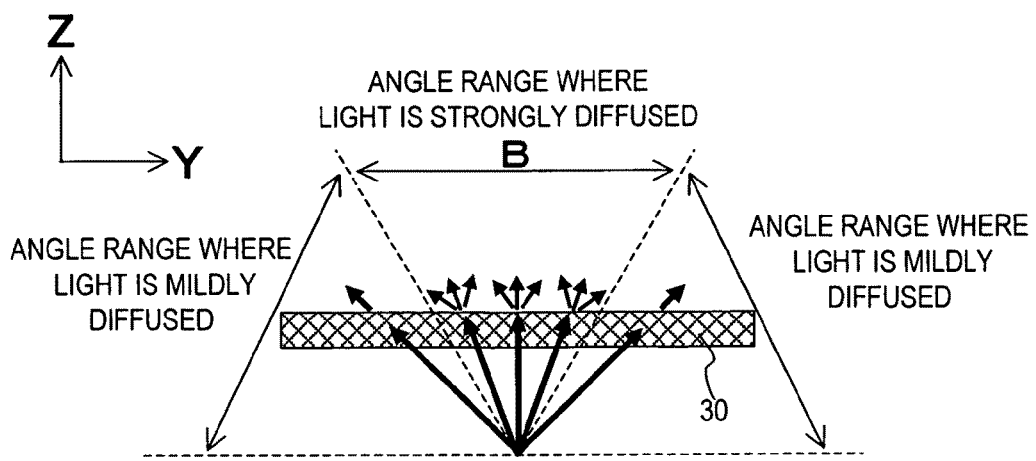

*FIG.15*
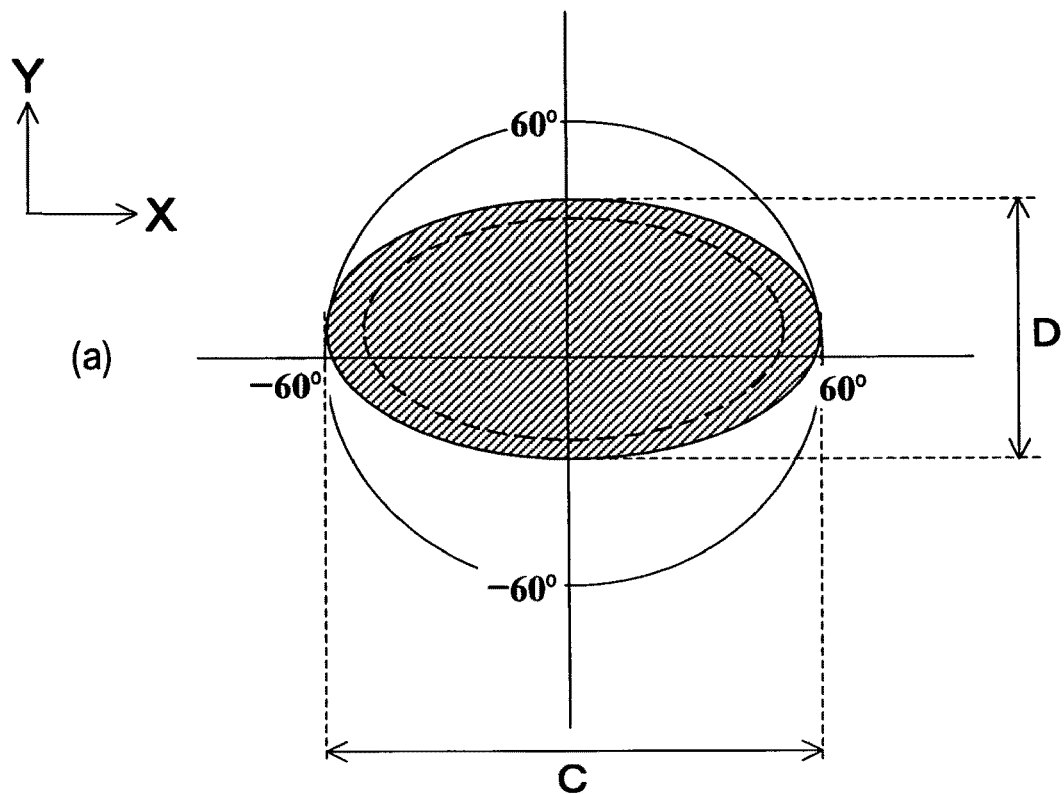
(a)
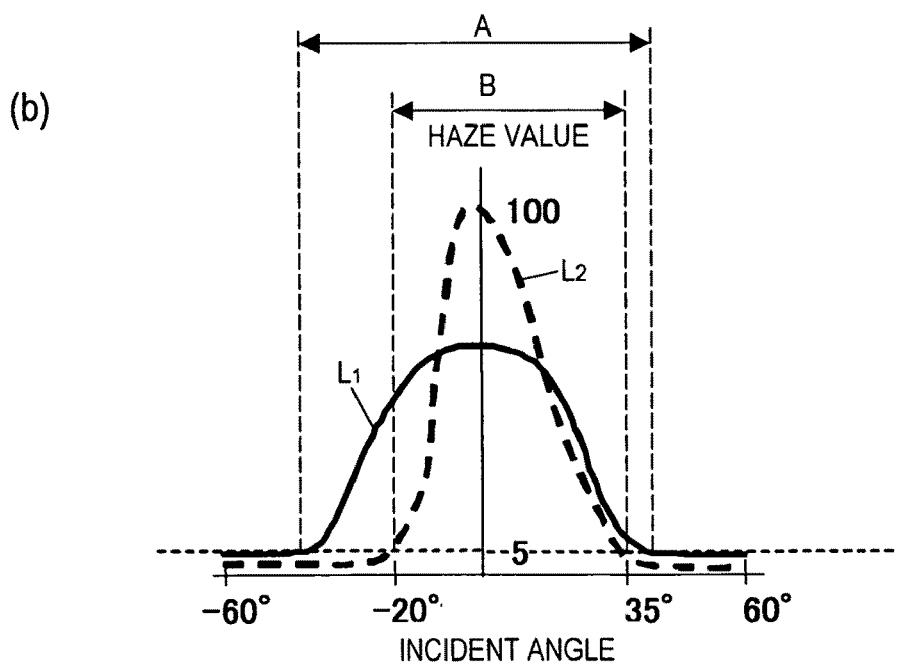
(b)

*FIG.16*
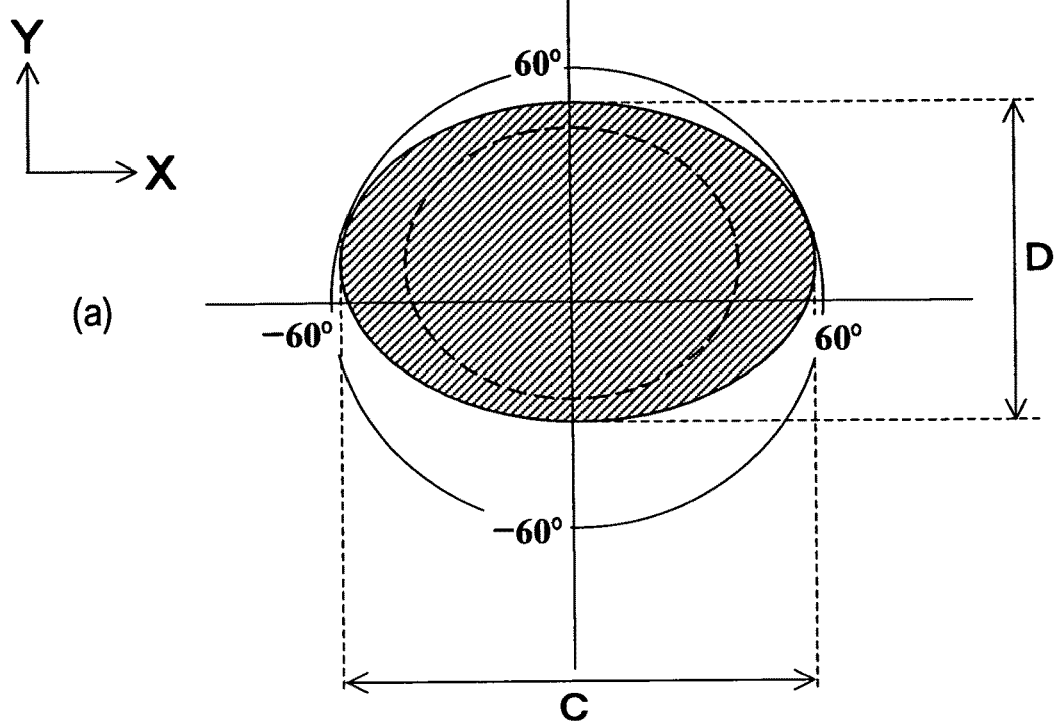
(a)
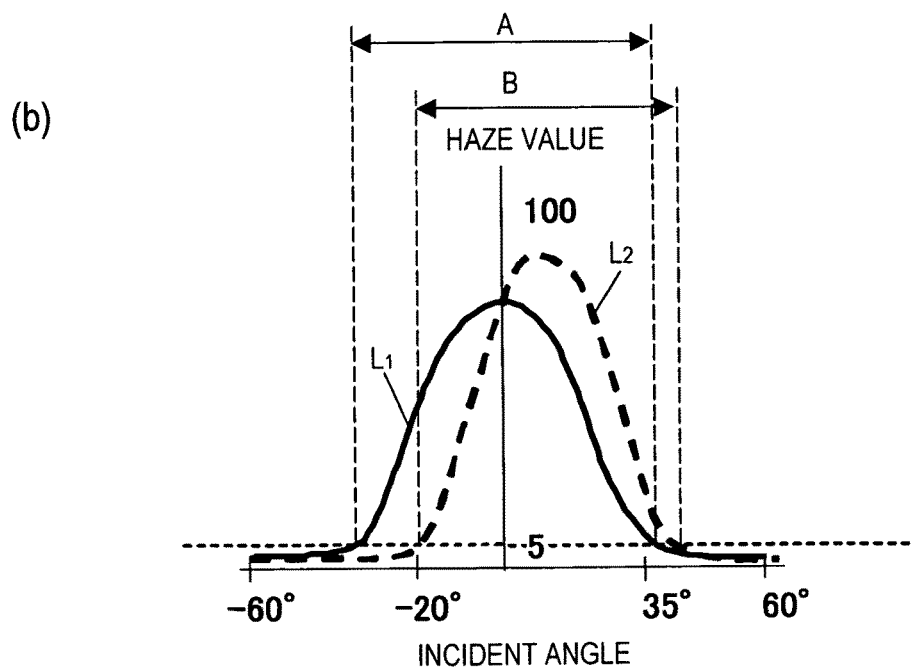
(b)

FIG.17
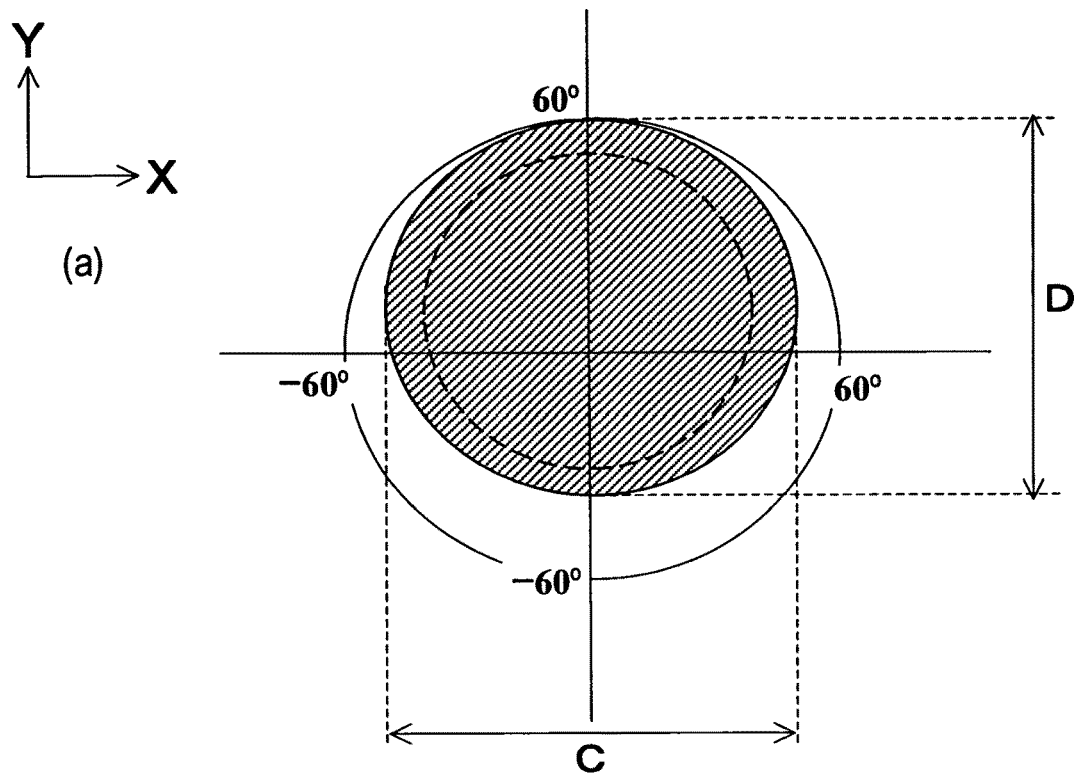
(a)
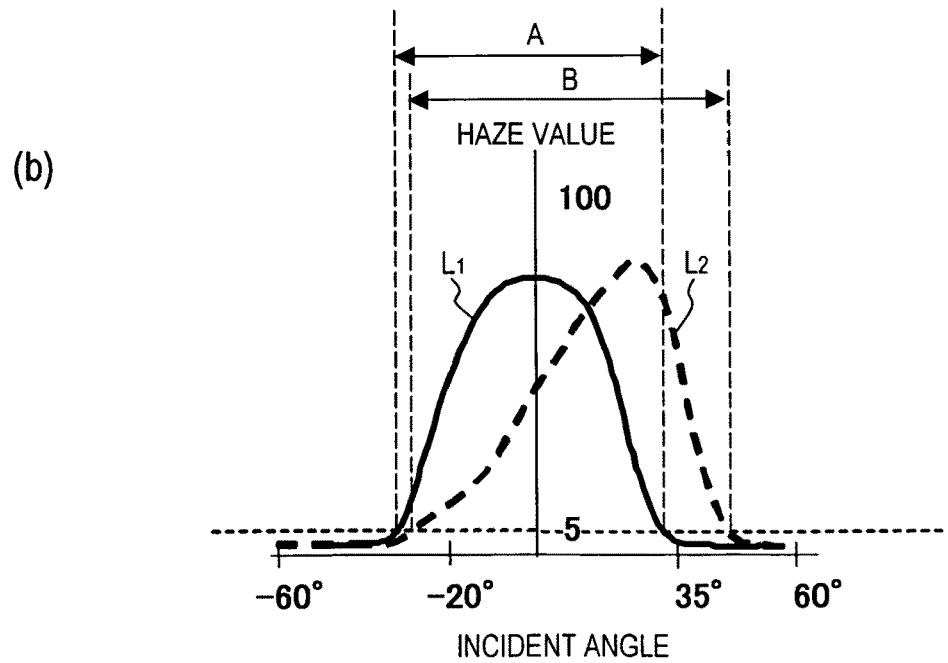
(b)

LIQUID CRYSTAL DISPLAY DEVICE HAVING PARTICULAR PRISM SHEET

This application is the U.S. national phase of International Application No. PCT/JP2006/321546, filed 27 Oct. 2006, which designated the U.S. and claims priority to Japanese Patent Application No. 2005-320758, filed 4 Nov. 2005, the entire contents of each of which are hereby incorporated by reference.

TECHNICAL FIELD

The present invention relates to a liquid crystal display device, and in particular to a liquid crystal display device including a light diffuser for diffusing light going out from a liquid crystal display panel.

BACKGROUND ART

In recent years, portable electronic devices such as mobile phones and PDAs (Personal Digital Assistants) are in wide use. In a display section of a portable electronic device, a liquid crystal display device is frequently used because of its advantages in terms of thinness, light weight, and low power consumption.

In a liquid crystal display device, the display element itself does not emit light, unlike self-light-emitting type display devices such as CRTs and PDPs (plasma display panels). Therefore, in a transmission-type liquid crystal display device, an illuminator called a backlight is provided at the rear face side of the liquid crystal display element, and an image is displayed as the transmitted amount of the illumination light from this backlight is controlled by the liquid crystal display element in a pixel-by-pixel manner.

Liquid crystal display devices of various methods are known. However, some methods (e.g., methods using a TN type or STN type liquid crystal display element) have a disadvantage of narrow viewing angles, and various techniques are under development for overcoming this disadvantage.

As a representative technique for improving the viewing angle characteristics of a liquid crystal display device, there is a method of adding an optical compensation plate. There is also known a method of enhancing the directivity (degree of parallelism) of light which is emitted from a backlight before the light enters a liquid crystal display element, and allowing the light having traveled through the liquid crystal display element to be diffused by a light diffuser (e.g., Patent Document 1).

An example of a liquid crystal display device having a light diffuser is shown in FIG. 21. The liquid crystal display device 500 shown in FIG. 21 includes a liquid crystal display panel 520, a backlight 510 disposed at the rear face side of the liquid crystal display panel 520, and a light diffuser 530 disposed at the viewer's side of the liquid crystal display panel 520.

The liquid crystal display panel 520 includes a pair of substrates 521 and 522 and a liquid crystal layer 523 provided therebetween. Although not shown here, on the surfaces of the substrates 521 and 522 facing the liquid crystal layer 523, electrodes for applying voltages across the liquid crystal layer 523 and alignment films for defining the orientation directions of liquid crystal molecules contained in the liquid crystal layer 523 are formed.

The backlight 510 includes a light source 501 and a light guide plate 502 for guiding the light having been emitted from the light source 501 to the liquid crystal display panel 520. The light guide plate 502 has a front face (light-outgoing surface) 502a through which light goes out toward the liquid crystal display panel 520 and a rear face 502b opposing the light-outgoing surface 502a. A plurality of prisms 503 are provided on the rear face 502b of the light guide plate 502.

While propagating within the light guide plate 502, the light having been emitted from the light source 501 is reflected toward the liquid crystal display panel 520 by the prisms 503 formed on the rear face 502b, so as to go out through the light-outgoing surface 502a. Each prism 503 has two slopes that are slanted at respectively difference predetermined angles with respect to the light-outgoing surface 502a, so that the light which is emitted from the backlight 510 has a very strong intensity along the display surface normal direction (frontal direction). In other words, a high directivity is imparted to the light emitted from the backlight 510.

When the light emitted from the backlight 510 has a high directivity, the light traveling through the liquid crystal layer 523 can be uniformly modulated (i.e., a uniform retardation can be imparted to the light traveling through the liquid crystal layer 523). Therefore, the viewing angle dependence of display quality associated with the refractive index anisotropy of liquid crystal molecules can be reduced. As it is, the light having traveled through the liquid crystal layer 523 has a high directivity, and has a large imbalance in luminance (that is, a very high luminance exists along the display surface normal direction whereas luminances along oblique directions are low). However, through diffusion by the light diffuser 530, the luminance imbalance is reduced, and the viewing angle is broadened. As a result, the liquid crystal display device 500 is able to perform good displaying in a broad viewing angle range.

As the light diffuser 530, a prism sheet as shown in FIG. 22 can be suitably used, for example. The prism sheet 530 includes a plurality of prisms 531 of triangular prism shapes. Each prism 531 has slopes 531s which are slanted with respect to the display surface normal direction, such that the light going out from the liquid crystal display panel 520 is diffused by experiencing total reflection (or refraction) at the slopes 531s of the prism 531. By appropriately setting the tilting angle of the slopes 531s in accordance with the luminance distribution of the light emitted from the backlight 510, a predetermined luminance distribution can be realized in the light which goes out from the prism sheet 530.

[Patent Document 1] Japanese Laid-Open Patent Publication No. 9-22011

DISCLOSURE OF INVENTION

Problems to be Solved by the Invention

However, according to a study of the inventors, it has been found that a desired luminance distribution may not necessarily be realized even by using the conventional prism sheet 530, and that it may be difficult to perform display with a high contrast ratio across a broad angle range.

The present invention has been made in view of the above problems, and an objective thereof is to realize a desired luminance distribution and perform display with a high contrast ratio across a broad angle range, in a liquid crystal display device having a light diffuser.

Means for Solving the Problems

A liquid crystal display device according to the present invention is a liquid crystal display device comprising: a light source; a liquid crystal display panel for modulating light emitted from the light source; and a light diffuser being disposed at a viewer's side of the liquid crystal display panel and diffusing light traveling through the liquid crystal display panel, wherein, the light diffuser is a prism sheet including a plurality of prisms; and each of the plurality of prisms has: a first prism section including a first slope slanted at a first angle with respect to a display surface normal direction; and a second prism section including a second slope slanted with respect to the display surface normal direction at a second angle which is different from the first angle and being disposed at the viewer's side of the first prism section. Thus, the aforementioned objective is met.

In a preferred embodiment, each of the plurality of prisms further includes a third prism section including a third slope slanted with respect to the display surface normal direction at a third angle which is different from the second angle and being disposed at the viewer's side of the second prism section.

In a preferred embodiment, each of the plurality of prisms has a top surface which is substantially perpendicular to the display surface normal direction.

In a preferred embodiment, the liquid crystal display device according to the present invention comprises a first polarizer disposed at the viewer's side of the light diffuser.

In a preferred embodiment, the liquid crystal display device according to the present invention further comprises a second polarizer disposed between the liquid crystal display panel and the light diffuser, wherein, a transmission axis of the first polarizer and a transmission axis of the second polarizer are substantially parallel.

In a preferred embodiment, a liquid crystal display device according to the present invention further comprises a third polarizer disposed at a side of the liquid crystal display panel opposite from the viewer's side.

In a preferred embodiment, the light diffuser diffuses light entering at an angle within a specific angle range more strongly than light entering at any other angle; the specific angle range in a first plane parallel to the display surface normal direction differs from the specific angle range in a second plane display surface parallel to the normal direction and intersecting the first plane; and given the specific angle range A in the first plane, the specific angle range B in the second plane, a viewing angle range C in the first plane where the liquid crystal display panel has a contrast ratio of 1 or more, and a viewing angle range D in the second plane where the liquid crystal display panel has a contrast ratio of 1 or more, a ratio A/B between the specific angle range A in the first plane and the specific angle range B in the second plane is substantially equal to a ratio C/D between the viewing angle range C in the first plane and the viewing angle range D in the second plane.

In a preferred embodiment, the specific angle range A in the first plane is substantially equal to or narrower than the viewing angle range C in the first plane, and the specific angle range B in the second plane is substantially equal to or narrower than the viewing angle range D in the second plane.

In a preferred embodiment, each of the plurality of prisms has a different shape on a cross section parallel to the first plane from a shape on a cross section parallel to the second plane.

In a preferred embodiment, the liquid crystal display device according to the present invention comprises an illuminator including the light source.

In a preferred embodiment, the illuminator has an intensity distribution such that a luminance in directions at an angle of 30° or more with respect to the display surface normal direction is 13% or less of a luminance in the display surface normal direction.

In a preferred embodiment, the illuminator has an intensity distribution such that a luminance in directions at an angle of 30° or more with respect to the display surface normal direction is 3% or less of a luminance in the display surface normal direction.

In a preferred embodiment, the illuminator includes a directivity controlling element for controlling directivity of light emitted from the light source.

Effects of the Invention

A light diffuser comprised in the liquid crystal display device according to the present invention is a prism sheet including a plurality of prisms, each prism having: a first prism section including a first slope slanted at a first angle with respect to a display surface normal direction; and a second prism section including a second slope slanted with respect to the display surface normal direction at a second angle which is different from the first angle and being disposed at the viewer's side of the first prism section. Therefore, the prism sheet comprised in the liquid crystal display device according to the present invention is able to convert the direction of light travel into a plurality of directions, thus making it easier to realize a desired luminance distribution than with the conventional prism sheet which can only convert the direction of light travel into one direction. Therefore, in accordance with the liquid crystal display of the present invention, a high contrast-ratio displaying can be performed across a broad angle range.

BRIEF DESCRIPTION OF DRAWINGS

[FIGS. 7](a) and (b) are cross-sectional views showing other exemplary prisms of a prism sheet.

[FIGS. 8](a) and (b) are cross-sectional views showing other exemplary prisms of a prism sheet.

[FIG. 10] A cross-sectional view schematically showing another liquid crystal display device 100A according to a preferred embodiment of the present invention.

[FIG. 11] A cross-sectional view schematically showing another liquid crystal display device 100B according to a preferred embodiment of the present invention.

[FIGS. 13](a) and (b) are diagrams for explaining a preferable function of a light diffuser.

[FIGS. 15](a) and (b) are diagrams showing a preferable combination of a contrast cone of an optical modulation section and light diffusing characteristics of a light diffuser.

[FIGS. 16](a) and (b) are diagrams showing a preferable combination of a contrast cone of an optical modulation section and light diffusing characteristics of a light diffuser.

[FIGS. 17](a) and (b) are diagrams showing a preferable combination of a contrast cone of an optical modulation section and light diffusing characteristics of a light diffuser.

Figure 1:
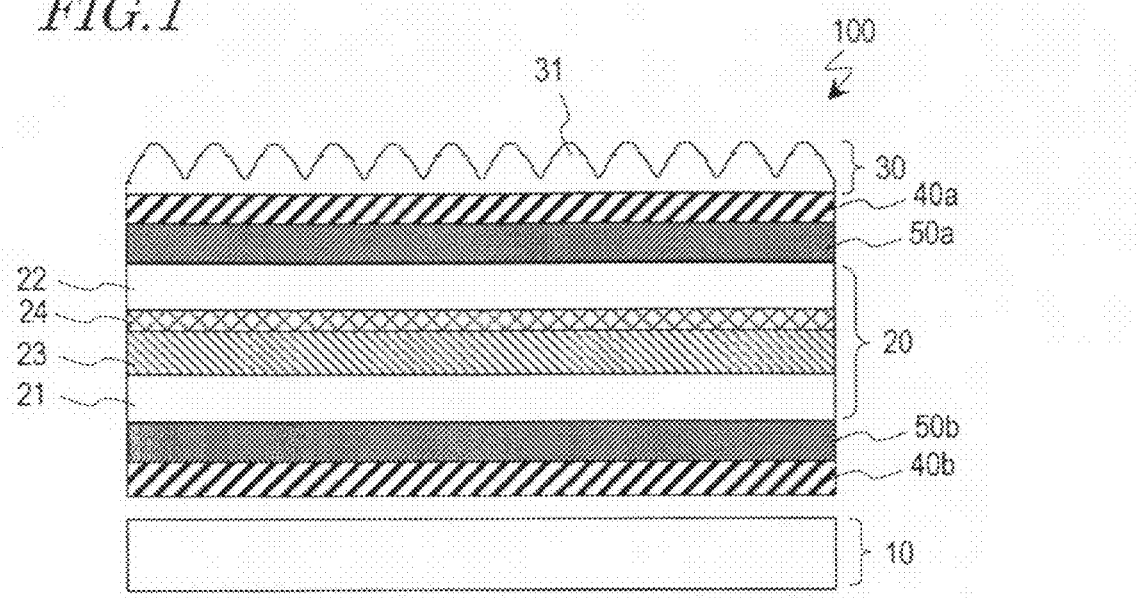
[FIG. 1] A cross-sectional view schematically showing a liquid crystal display device 100 according to a preferred embodiment of the present invention.

DESCRIPTION OF THE REFERENCE NUMERALS 10 illuminator (backlight)
20 liquid crystal display panel
21 rear substrate
22 front substrate
23 liquid crystal layer
24 color filter
30 light diffuser (prism sheet)
31 prism
31a first prism section
31b second prism section
31c third prism section
31s1 first slope
31s2 second slope
31s3 third slope
31t top surface
32 planarization layer
40a, 40b polarizing plate
50a, 50b phase difference compensation element
100, 100A, 100B liquid crystal display device Best Mode For Carrying Out The Invention Hereinafter, an embodiment of the present invention will be described with reference to the drawings. Note that the present invention is not limited to the following embodiment.

Embodiment 1

FIG. 1 shows a liquid crystal display device 100 according to the present embodiment. As shown in FIG. 1, the liquid crystal display device 100 includes a liquid crystal display panel 20, an illuminator (backlight) 10 disposed at a rear face side of the liquid crystal display panel 20, and a light diffuser 30 disposed at a viewer's side of the liquid crystal display panel 20.

The liquid crystal display panel 20 includes a pair of substrates 21 and 22, and a liquid crystal layer 23 provided therebetween. On surfaces of the substrates 21 and 22 facing the liquid crystal layer 23, electrodes for applying voltages across the liquid crystal layer 23 and alignment films for defining the orientation directions of liquid crystal molecules contained in the liquid crystal layer 23 (neither of them is shown) are formed. Moreover, in the present embodiment, color filters 24 are provided on the liquid crystal layer 23 side of the substrate 22 disposed at the viewer's side.

At the viewer's side and the rear face side (i.e., the opposite side from the viewer's side) of the liquid crystal display panel 20, respectively, polarizing plates 40a and 40b are disposed. Between the polarizing plate 40a and the liquid crystal display panel 20, and between the polarizing plate 40b and the liquid crystal display panel 20, respectively, phase difference compensation elements 50a and 50b are disposed. Various known phase difference plates may be used as the phase difference compensation elements 50a and 50b. Alternatively, a phase difference compensation element may be provided only either: between the polarizing plate 40a and the liquid crystal display panel 20; or between the polarizing plate 40b and the liquid crystal display panel 20.

The illuminator 10 of the present embodiment emits light having a high directivity. The specific construction of the illuminator 10 will be described later. When the light emitted from the illuminator 10 has a high directivity, light traveling through the liquid crystal layer 23 can be uniformly modulated (i.e., a uniform retardation can be imparted to the light traveling through the liquid crystal layer 23), whereby the viewing angle dependence of display quality associated with the refractive index anisotropy of the liquid crystal molecules can be reduced. As it is, the light having traveled through the liquid crystal layer 23 has a high directivity and a large imbalance in luminance (that is, a very high luminance exists along the display surface normal direction whereas luminances along oblique directions are low). However, through diffusion by the light diffuser 30, the luminance imbalance is reduced, whereby the viewing angle is broadened.

Figure 2:
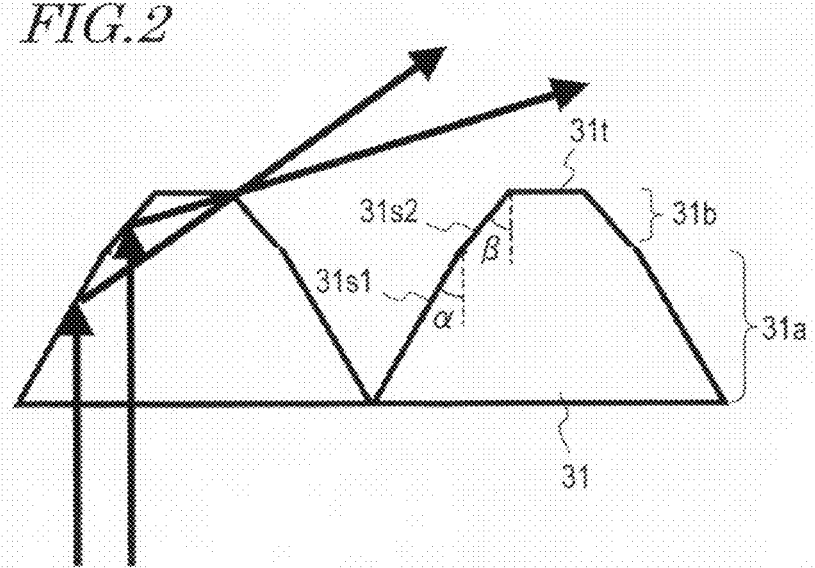
[FIG. 2] A cross-sectional view showing, enlarged, prisms of a prism sheet included in the liquid crystal display device 100.

The light diffuser 30 according to the present embodiment is a prism sheet including a plurality of prisms 31. FIG. 2 shows prisms 31 of the prism sheet 30 enlarged.

As shown in FIG. 2, each prism 31 includes a first prism section 31a, and a second prism section 31b located on the viewer's side of the first prism section 31a. The prism 31 according to the present embodiment has a cross-sectional shape consisting of two trapezoids which are stacked together, the first prism section 31a and the second prism section 31b each having a trapezoidal cross-sectional shape.

The first prism section 31a includes a first slope 31s1 which is slanted at a predetermined angle α from the display surface normal direction. Moreover, the second prism section 31b includes a second slope 31s2 which is slanted at an angle β, different from the tilting angle α of the first slope 31s1, from the display surface normal direction.

Figure 22:
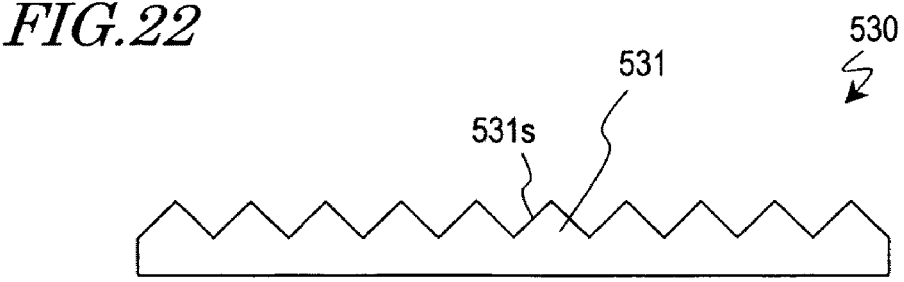
[FIG. 22] A cross-sectional view schematically showing a conventional prism sheet.

Since the tilting angle α of the first slope 31s1 and the tilting angle β of the second slope 31s2 are different, the light undergoing total reflection at the first slope 31s1 and the light undergoing total reflection at the second slope 31s2 are oriented in respectively different directions, as schematically shown in FIG. 2. As a result, the prism sheet 30 is able to convert the direction of light travel into a plurality of directions, thus making it easier to realize a desired luminance distribution than with the conventional prism sheet 530 (see FIG. 22) which can only convert the direction of light travel into one direction. Therefore, in accordance with the liquid crystal display device 100 of the present embodiment, a high contrast-ratio displaying can be performed across a broad angle range.

Figure 3:
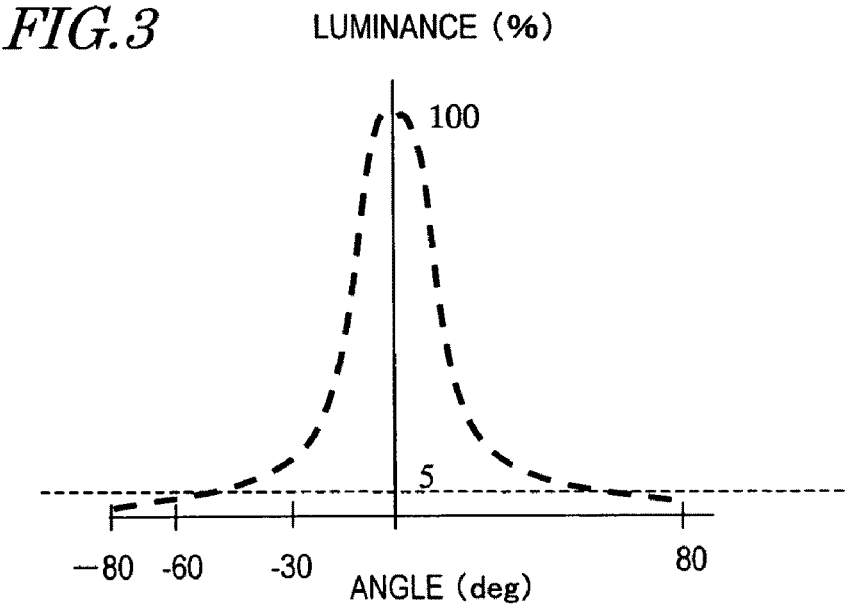
[FIG. 3] A graph showing an exemplary luminance distribution of light having been emitted from an illuminator included in the liquid crystal display device 100.

Effects of the prism sheet 30 in the present embodiment will be described more specifically. First, FIG. 3 shows an exemplary luminance distribution of light having been emitted from the illuminator 10. As shown in FIG. 3, the light having been emitted from illuminator 10 has a high directivity such that there is a very high luminance in the frontal direction.

Figure 4:
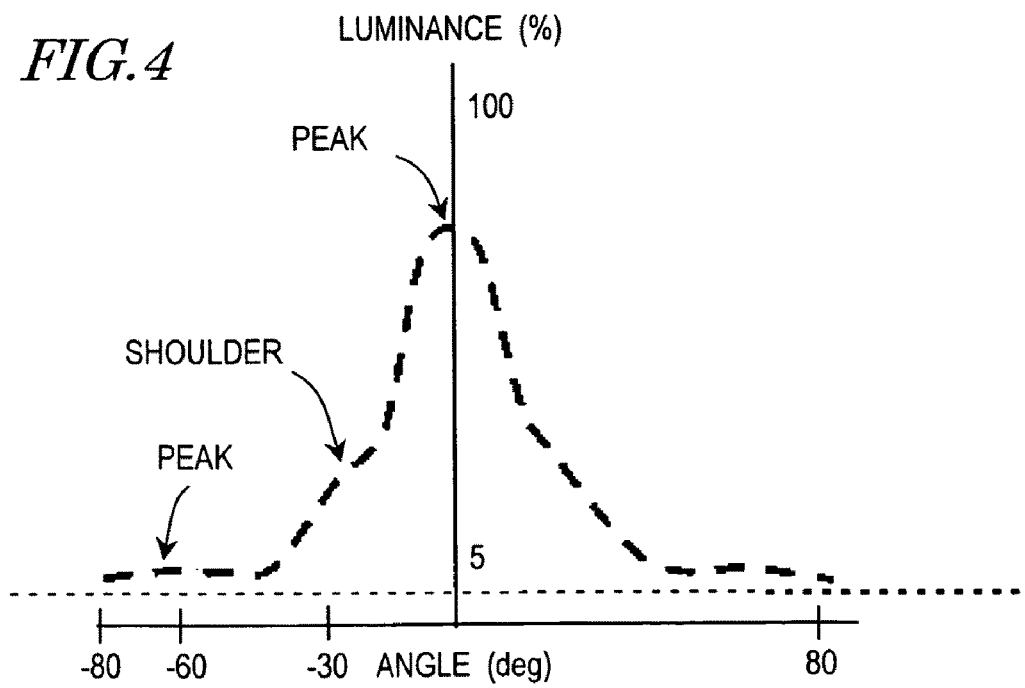
[FIG. 4] A graph showing an exemplary luminance distribution of light diffused by a prism sheet included in the liquid crystal display device 100.

Next, FIG. 4 shows an exemplary luminance distribution of light diffused by the prism sheet 30, which is a light diffuser. First of all, it can be seen that the luminance imbalance is reduced as compared to the luminance distribution shown in FIG. 3. Moreover, in addition to the peak near 0°, there are shoulders near ±30°, and peaks near ±60°. The shoulders near ±35° are ascribable to total reflection at the first slope 31s1, whereas the peaks near ±60° are ascribable to total reflection at the second slope 31s2.

Figure 5:
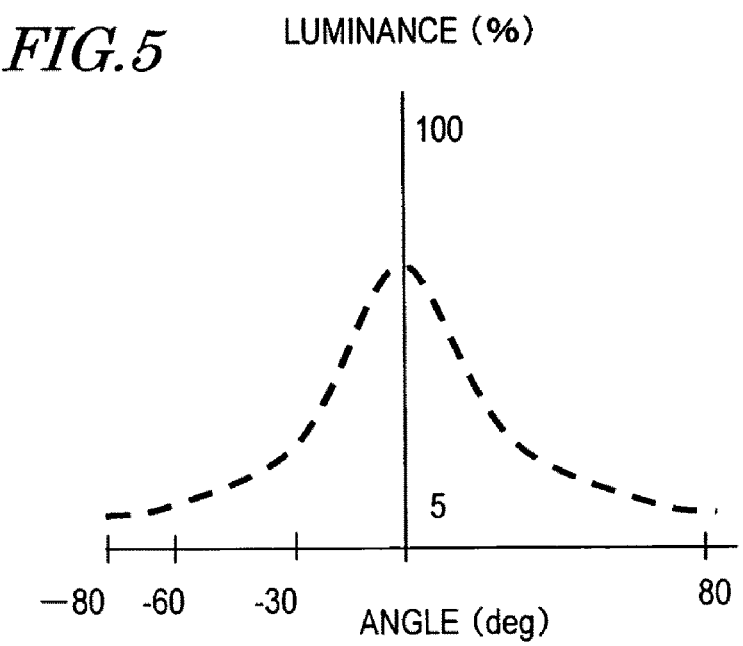
[FIG. 5] A graph showing an exemplary luminance distribution of light diffused by a conventional prism sheet.

Next, FIG. 5 shows a luminance distribution of light diffused by the conventional prism sheet 530. As shown in FIG. 5, although the luminance imbalance itself is reduced, no clear shoulders or peaks exist except for near 0°. This is because the prism sheet 530 is only able to convert the direction of light travel into one direction.

As can be seen from a comparison between FIG. 4 and FIG. 5, in accordance with the prism sheet 30 of the present embodiment, luminance can be increased across a broad angle range, and an increased contrast ratio can be obtained across a broad angle range.

The tilting angle α of the first slope 31s1 and the tilting angle β of the second slope 31s2 are to be appropriately set according to the desired luminance distribution. Light traveling along the display surface normal direction is reflected by the first slope 31s1 into a direction constituting an angle of 2α with respect to the display surface normal direction, and reflected by the second slope 31s2 into a direction constituting an angle of 2β with respect to the display surface normal direction. Therefore, the tilting angles α and β may be set in accordance with the angles at which peaks and shoulders are desired. Moreover, the widths of the peaks and shoulders occurring in the luminance distribution of diffused light depend on the level of directivity of the light from the illuminator 10 (e.g., as represented by its half-intensity angle), and this should preferably be also taken into consideration when setting the tilting angles α and β. From the standpoint of enhancing the contrast ratio across a sufficiently broad angle range, it is preferable that there is a difference of 15° or more between the tilting angle α of the first slope 31s1 and the tilting angle β of the second slope 31s2.

Note that the specific structure of the prism sheet 30 is not limited to what is exemplified here. So long as the prism 31 includes a plurality of slopes which are slanted at different tilting angles, the direction of light travel can be converted into a plurality of directions, whereby a desired luminance distribution can be realized.

Figure 6:
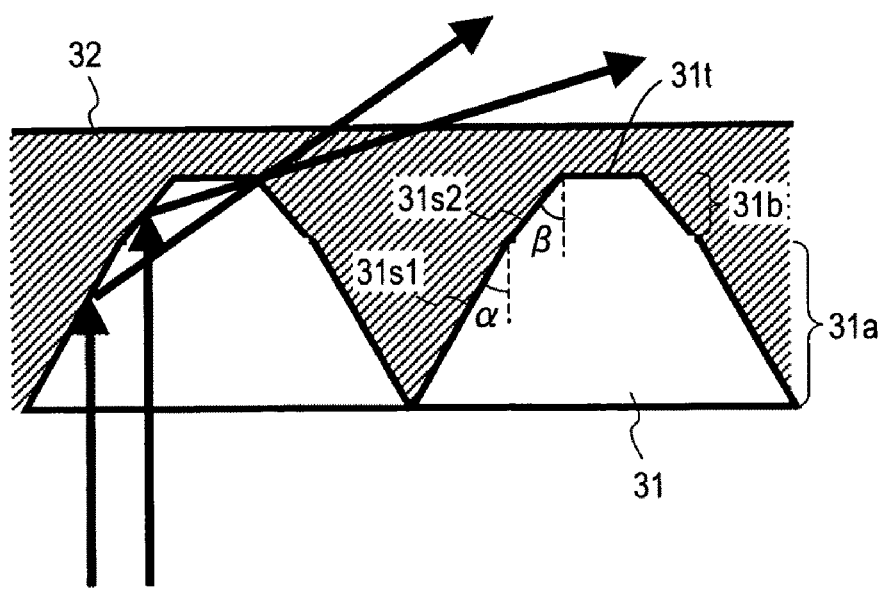
[FIG. 6] A cross-sectional view showing other exemplary prisms of a prism sheet.

For example, although the prisms 31 shown in FIG. 2 adjoin an air layer, a planarization layer 32 may be provided so as to cover the prism 31 as shown in FIG. 6. By providing the planarization layer 32, reflection of external light at the surface of the prism sheet 30 can be suppressed.

Moreover, although each prism 31 shown in FIG. 2 has a top surface 31t which is substantially perpendicular to the display surface normal direction, the prism 31 does not need to have any top surface, as shown in FIGS. 7(a) and (b). In each prism 31 shown in FIGS. 7(a) and (b), the second prism section 31b has a triangular cross-sectional shape, without a top surface. Such prisms 31 can also convert the direction of light travel into a plurality of directions, thus providing similar effects.

Note that, the top surface 31t of each prism 31 shown in FIG. 2 and FIG. 6 does not have the function of converting the direction of light travel, unlike the slopes 31s1 and 31s2. Therefore, providing the top surface 31t results in an increase amount of light whose direction of travel is not converted, thus resulting in a higher luminance in the frontal direction. Therefore, in order to maintain a relatively high luminance in the frontal direction, it is preferable to provide the top surface 31t.

Although the aforementioned drawings illustrate prisms 31 each having two prism sections (i.e., the first prism section 31a and the second prism section 31b), each prism 31 may have three or more prism sections. For example, as in prisms 31 shown in FIGS. 8(a) and (b), a third prism section 31c located on the viewer's side of the second prism section 31b may be provided. The third prism section 31c includes a third slope 31s3 which is slanted at an angle γ, different from the tilting angle β of the second slope 31s2, from the display surface normal direction.

The tilting angle γ of the third slope 31s3 may be the same as or different from the tilting angle α of the first slope 31s1. When the tilting angle γ of the third slope 31s3 and the tilting angle α of the first slope 31s1 are the same, each prism 31 converts the direction of light travel into two directions. On the other hand, when the tilting angle γ of the third slope 31s3 differs from the tilting angle α of the first slope 31s1, each prism 31 converts the direction of light travel into three directions. Thus, by further providing a slope slanted at an angle which is different from those of the first slope 31s1 and the second slope 31s2, the direction of light travel can be converted into even more directions, whereby a greater variety of luminance distributions can be realized.

Figure 9:
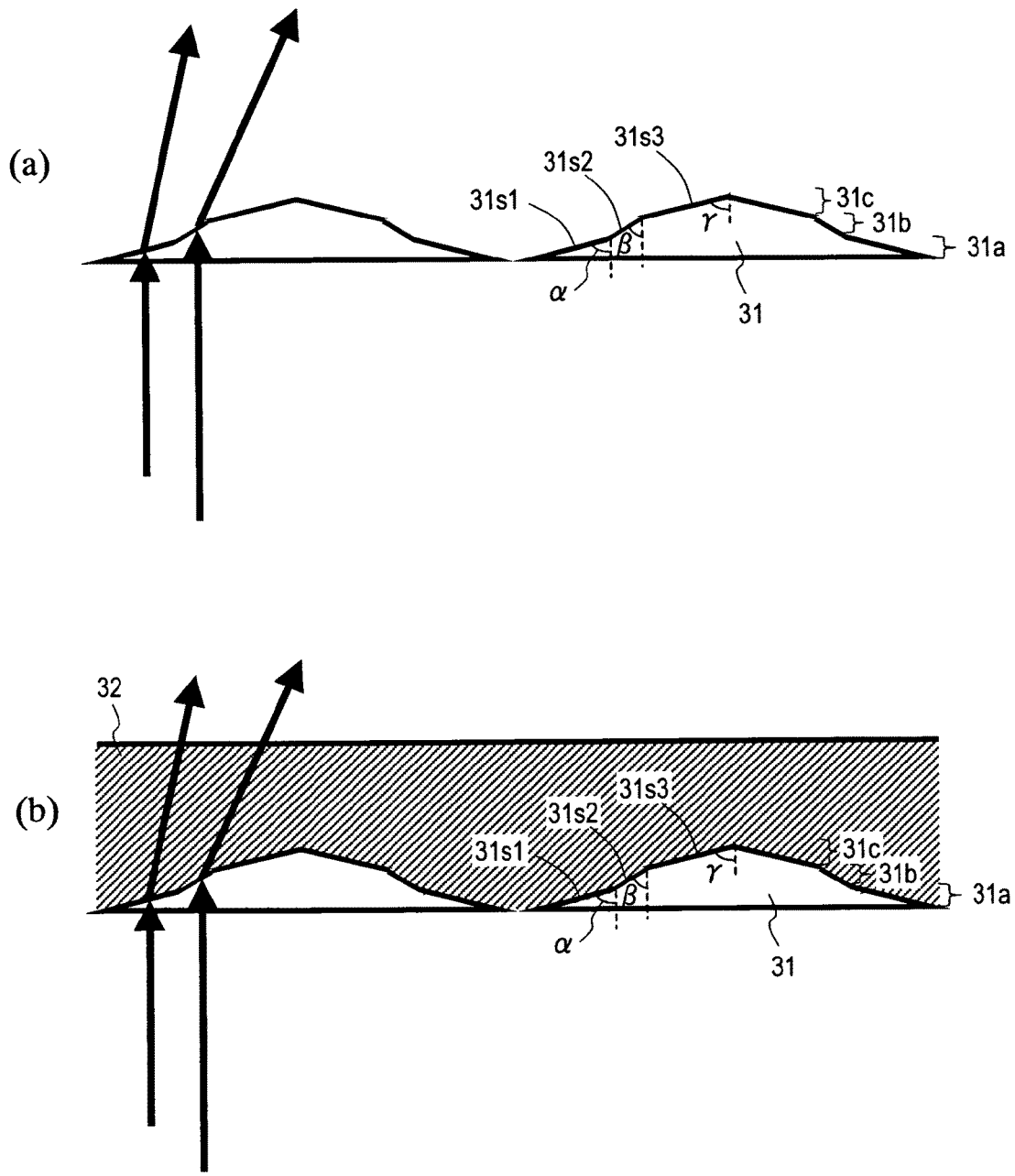
[FIGS. 9](a) and (b) are cross-sectional views showing other exemplary prisms of a prism sheet.

Moreover, the prisms 31 are not limited to total-reflection type prisms. The prisms 31 may be refraction-type prisms, as shown in FIGS. 9(a) and (b). In each prism 31 shown in FIGS. 9(a) and (b), light is refracted by a first slope 31s1, a second slope 31s2, and a third slope 31s3, thus being diffused. The prisms 31 utilizing such refraction can also provide similar effects.

Although the present embodiment has illustrated prisms 31 whose cross-sectional shape is symmetric between right and left, the cross-sectional shape of each prism 31 does not need to be symmetric between right and left. In accordance with the desired luminance distribution or the original luminance distribution (i.e., luminance distribution of the light emitted from the illuminator 10), the cross-sectional shape of each prism 31 may be made asymmetric between right and left.

The prism sheet 30 according to the present embodiment can be formed by using various materials (e.g., resins such as thermosetting resins or UV-curing resins). In order to form a plurality of slopes having different tilting angles, for example, a die which accords with the shapes of the prisms 31 each having a plurality of prism sections may be produced, and a dry film formed from a UV-curing resin may be press-molded by using this die, and thereafter cured with ultraviolet. Alternatively, a UV-curing resin or a thermosetting resin may be poured into this die by spin coating technique, and thereafter such resin having been molded may be allowed to cure.

Note that, in order to prevent glare of the display surface due to external light (ambient light) being reflected at the surface of the prism sheet 30, a construction as shown in FIG. 10 may be adopted. Whereas the polarizing plate 40a is disposed between the liquid crystal layer 23 and the prism sheet 30 in the liquid crystal display device 100 shown in FIG. 1, the polarizing plate 40a is disposed at the viewer's side of the prism sheet 30 in the liquid crystal display device 100A shown in FIG. 10. When the polarizing plate 40a is disposed at the viewer's side of the prism sheet 30, external light entering the prism sheet 30 from the viewer's side is absorbed by the polarizing plate 40a, thus being reduced in amount. As a result, reflection of external light at the surface of the prism sheet 30 is suppressed, whereby glare of the display surface is prevented.

Moreover, as in a liquid crystal display device 100B shown in FIG. 11, polarizing plates 40a may be provided both between the liquid crystal layer 23 and the prism sheet 30 and at the viewer's side of the prism sheet 30. When light having traveled through the liquid crystal display panel 20 enters the prism sheet 30, which is a light diffuser, there is light which heads toward the liquid crystal display panel 20 due to backscattering. This light, called stray light, is a cause for deteriorated display quality. By providing the polarizing plate 40a also between the liquid crystal layer 23 and the prism sheet 30, such stray light is reduced by being absorbed by the polarizing plate 40a located between the liquid crystal layer 23 and the prism sheet 30. Therefore, deterioration of display quality due to stray light is suppressed.

In order to efficiently utilize the light having traveled through the liquid crystal display panel 20, it is preferable that the transmission axis of the polarizing plate 40a disposed at the viewer's side of the prism sheet 30 and the transmission axis of the polarizing plate 40a disposed between the prism sheet 30 and the liquid crystal layer 23 are substantially parallel. More specifically, the angle between the transmission axes of the two polarizing plates 40a is preferably 5° or less, and more preferably 2° or less.

Note that, in order to suppress deterioration of display quality due to stray light, an anti-reflection film may be disposed between the liquid crystal display panel 20 and the prism sheet 30, instead of a polarizing plate 40a. By providing an anti-reflection film, reflection of stray light can be suppressed and thus deterioration of display quality due to stray light can be suppressed. As an anti-reflection film, various films known as AR films can be used, e.g., a multilayered interference film including a plurality of layers having different refractive indices.

Now, another advantage of using the prism sheet 30 as a light diffuser will be described with reference to FIG. 12 and FIGS. 13(a) and (b). In conventional liquid crystal display devices having a light diffuser, a problem of display blurring may occur. As has already been described, in order to increase the contrast ratio, the directivity of light entering the liquid crystal layer should preferably be as high as possible. In other words, it is preferable to increase the light perpendicularly entering the liquid crystal layer as much as possible, and reduce the light obliquely entering the liquid crystal layer as much as possible. However, naturally, there is more than little light obliquely entering the liquid crystal layer, and there exists light having a large incident angle with respect to the liquid crystal layer in actuality. Light having a large incident angle with respect to the liquid crystal layer is light which will not be sufficiently modulated by the liquid crystal layer and the phase difference plate. Therefore, if such light is diffused into the frontal direction by a light diffuser, display will be blurred.

Figure 12:
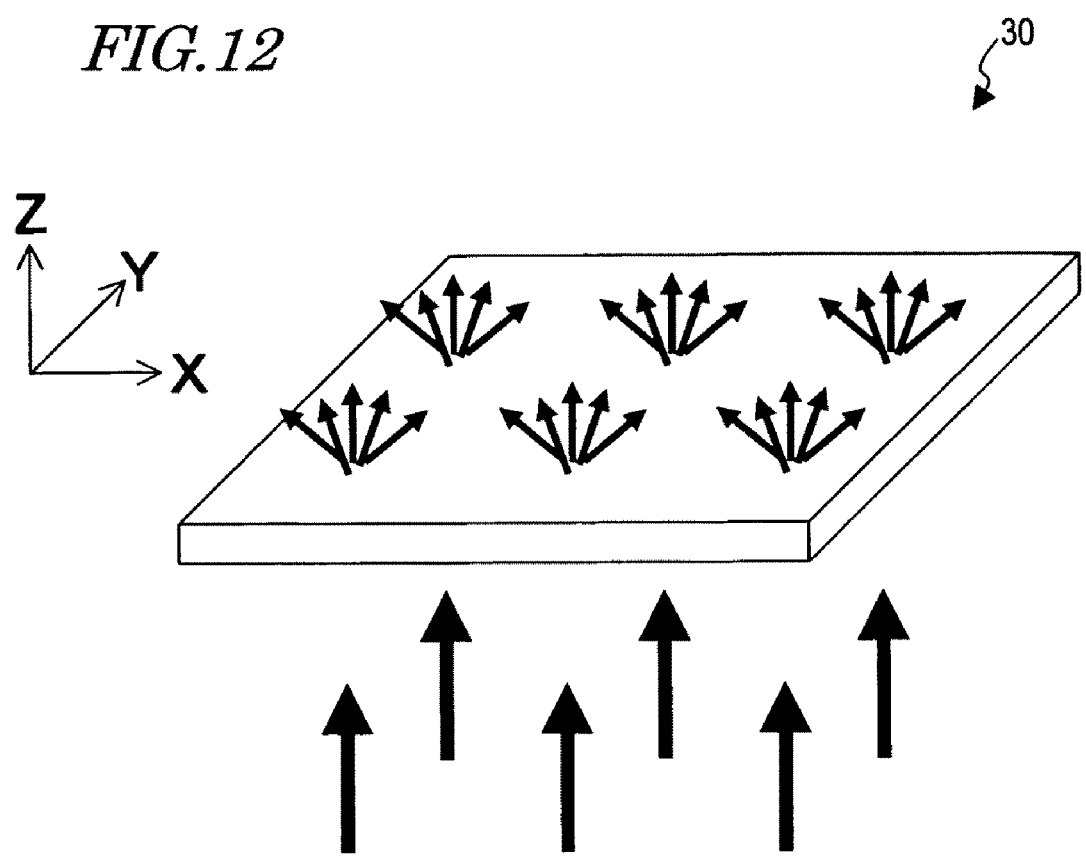
[FIG. 12] A diagram for explaining a function of a light diffuser included in liquid crystal display devices 100, 100A, and 100B.

FIG. 12 is a perspective view schematically showing how the prism sheet 30 diffuses light. In FIG. 12 are shown two directions X and Y orthogonal to each other and parallel to the display surface, as well as a direction Z which is perpendicular to the display surface (display surface normal direction). FIG. 13(a) is a diagram showing a cross section which is parallel to the directions X and Z in FIGS. 12, and FIG. 13(b) is a diagram showing a cross section which is parallel to the directions Y and Z in FIG. 12. Note that the prisms 31 are omitted from FIG. 12 and FIGS. 13(a) and (b).

As schematically shown in FIG. 12, the prism sheet 30 diffuses light which has been modulated by an optical modulation section (which is a collective name for the liquid crystal layer 23 and the phase difference compensation elements 50a and 50b) of the liquid crystal display panel 20. At this time, as shown in FIGS. 13(a) and (b), the prism sheet 30 diffuses light which enters in a specific angle range more strongly than light which enters at any other angle. Specifically, the prism sheet 30 strongly diffuses light entering at relatively small incident angles (i.e., angle constituted by the incident light and the display surface normal direction), while mildly diffusing light entering at relatively large incident angles.

Since the prism sheet 30 has the aforementioned incident angle dependence in its light diffusing characteristics, the prism sheet 30 is able to diffuse light which perpendicularly enters the liquid crystal layer 23 and light which enters at small incident angles, while hardly diffusing any light which enters the liquid crystal layer 23 at large incident angles. Therefore, display blurring due to the light which enters the liquid crystal layer 23 at large incident angles being diffused into the frontal direction is prevented.

Preferably, the angle range in which the prism sheet 30 strongly diffuses light (referred to as a "high-diffusion angle range") differs between a plane which is parallel to the directions X and Z and a plane which is parallel to the directions Y and Z, as shown in FIG. 13(a) and FIG. 13(b). In other words, it is preferable that the high-diffusion angle range of the prism sheet 30 differs depending on the azimuth in the display surface, and in further other words, it is preferable that the high-diffusion angle range of the prism sheet 30 has an azimuth angle dependence.

As described above, it is preferable that the light diffusing characteristics of the prism sheet 30 have a three-dimensional anisotropy. Furthermore, if this three-dimensional anisotropy of the light diffusing characteristics is set in accordance with the characteristics of light which is modulated by the optical modulation section, display blurring is effectively prevented and a high quality displaying can be easily realized. Hereinafter, the relationship between the characteristics of light which is modulated by the optical modulation section and the three-dimensional anisotropy of the light diffusing characteristics will be specifically described.

As a parameter with which to evaluate the characteristics of light having been modulated by the optical modulation section, the inventors have paid attention to a ratio between luminance in a white displaying state and luminance in a black displaying state, i.e., the contrast ratio. Thus, the inventors have found that the display quality can be greatly improved by setting the high-diffusion angle range of the prism sheet 30 in accordance with the contrast characteristics of the optical modulation section.

Figure 14:
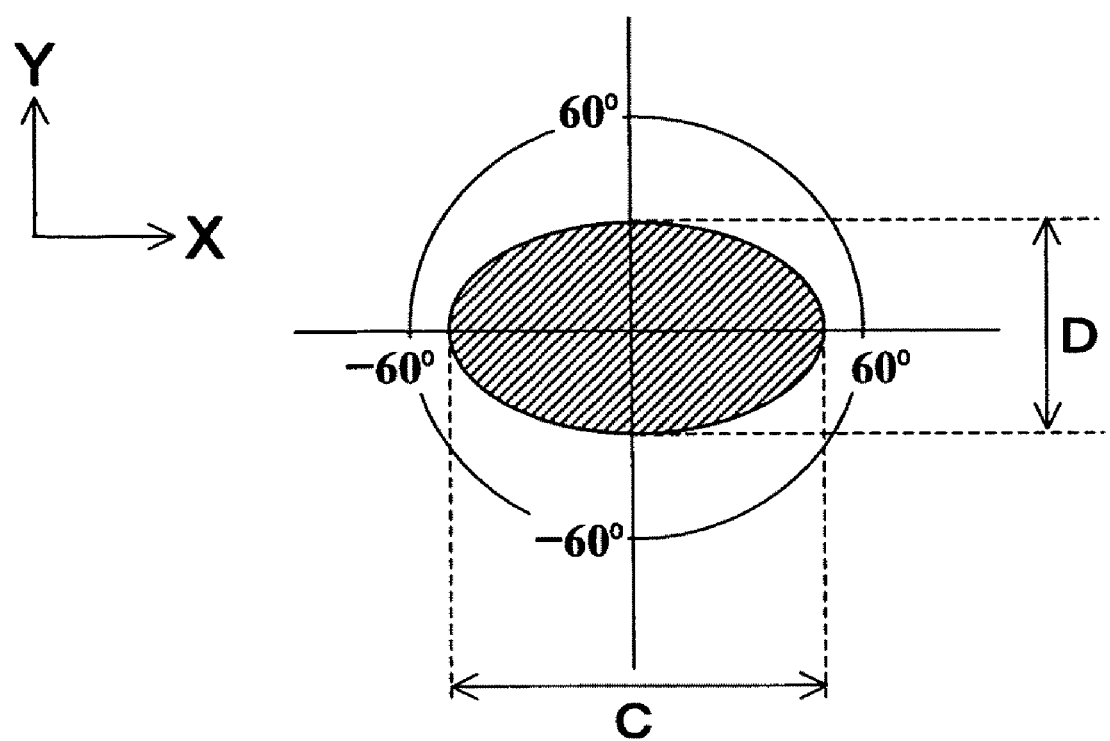
[FIG. 14] A diagram showing exemplary contrast characteristics of an optical modulation section, showing a relationship between azimuth and contrast ratio within a display surface.

FIG. 14 shows exemplary contrast characteristics of the optical modulation section. FIG. 14 is a diagram showing a relationship between azimuth and contrast ratio within the display surface. In FIG. 14, a hatched portion represents a viewing angle range in which the contrast ratio is 1 or more. This portion will hereinafter be referred to as a contrast cone.

As can be seen from FIG. 14, the contrast cone has different widths depending on the azimuth within the display surface. In the example shown in FIG. 14, the contrast cone has the broadest width along the direction X and the narrowest width along the direction Y. Thus, the contrast characteristics of the optical modulation section have an azimuth angle dependence.

The contrast ratio being less than 1 means that the luminance in a black displaying state is higher than the luminance in a white displaying state, indicating that light is not suitably modulated by the optical modulation section. On the other hand, the contrast ratio being 1 or more means that light is suitably modulated by the optical modulation section. Therefore, display blurring can be effectively improved by setting the azimuth angle dependence of the high-diffusion angle range of the prism sheet 30 in accordance with the azimuth angle dependence of the contrast cone.

Specifically, given a high-diffusion angle range A in a certain plane which is parallel to the display surface normal direction (referred to as a "first plane")(see FIG. 13(a)), a high-diffusion angle range B in a plane (referred to as a "second plane") which is parallel to the display surface normal direction and which intersects the first plane (see FIG. 13(b)), and viewing angle ranges C and D respectively in the first plane and the second plane in which the contrast ratio is 1 or more (see FIG. 14), the light diffusing characteristics of the prism sheet 30 are set so that a ratio A/B between A and B is substantially equal to a ratio C/D between C and D. In other words, in directions where the contrast cone has relatively narrow width, the high-diffusion angle range of the prism sheet 30 is also relatively narrow, whereas in directions where the contrast cone has relatively broad width, the high-diffusion angle range of the prism sheet 30 is also relatively broad. Therefore, without much diffusing the light which has not been suitably modulated by the optical modulation section, the prism sheet 30 is able to diffuse light which has been suitably modulated by the optical modulation section, thus effectively improving display blurring.

In order to enhance the effects of improving display blurring, it is preferable that the high-diffusion angle range A in the first plane is substantially equal to or narrower than the viewing angle range C in the first plane where the contrast ratio is 1 or more, and it is preferable that the high-diffusion angle range B in the second plane is substantially equal to or narrower than the viewing angle range D in the second plane where the contrast ratio is 1 or more. Adopting such a construction makes it possible to allow substantially only the light within the contrast cone (i.e., light in the viewing angle ranges where the contrast ratio is 1 or more) to be strongly diffused, whereby display blurring can be improved even more effectively.

Next, a preferable relationship between the contrast characteristics of the optical modulation section and the light diffusing characteristics of the prism sheet 30 will be described more specifically. FIG. 15, FIG. 16, and FIG. 17 show examples of preferable combinations of a contrast cone of the optical modulation section and the light diffusing characteristics of the prism sheet 30. FIG. 15(a), FIG. 16(a), and FIG. 17(a) illustrate contrast cones of the optical modulation section, whereas FIG. 15(b), FIG. 16(b), and FIG. 17(b) illustrate light diffusing characteristics of the prism sheet 30. In FIG. 15(b), FIG. 16(b), and FIG. 17(b), an incident angle dependence of haze values within the first plane (i.e., a plane which is parallel to the directions X and Z) is indicated by a curve L1, and an incident angle dependence of haze values within the second plane (i.e., a plane which is parallel to the directions Y and Z) is indicated by a curve L2.

The contrast cone shown in FIG. 15(a) has a relatively broad width along the direction X and a relatively narrow width along the direction Y. Correspondingly, as shown in FIG. 15(b), the curve L1 indicating the incident angle dependence of the haze value within the first plane has a broader shape than that of the curve L2 indicating the incident angle dependence of the haze value within the second plane. That is, as shown in FIG. 15(a), the viewing angle range C in the first plane where the contrast ratio is 1 or more is broader than the viewing angle range D in the second plane where the contrast ratio is 1 or more, and, as shown in FIG. 15(b), the high-diffusion angle range A in the first plane is broader than the high-diffusion angle range B in the second plane. Note that, in FIG. 15(b), an angle range where the haze value is 5 or more is shown as the high-diffusion angle range.

Moreover, as can be seen from a comparison between FIGS. 15(a) and (b), the high-diffusion angle range A in the first plane is smaller than the viewing angle range C in the same plane where the contrast ratio is 1 or more. Moreover, the high-diffusion angle range B in the second plane is smaller than the viewing angle range D in the same plane where the contrast ratio is 1 or more.

Thus, by setting the incident angle dependence of the haze value of the prism sheet 30 in accordance with the shape of the contrast cone, display blurring is suppressed and the display quality can be greatly improved.

Also in the combination shown in FIGS. 16(a) and (b) and the combination shown in FIGS. 17(a) and (b), the haze value of the prism sheet 30 is appropriately set in accordance with the shape of each contrast cone, so that similar effects are obtained.

In order to impart three-dimensional anisotropy to the light diffusing characteristics of the prism sheet 30, the shape of the prism 31 may be adjusted. For example, by ensuring that the cross-sectional shape of the prism 31 parallel to the first plane and its cross-sectional shape parallel to the second plane are different, the light diffusing characteristics in the first plane of the prism 31 can be made different from its light diffusing characteristics in the second plane.

Figure 18:
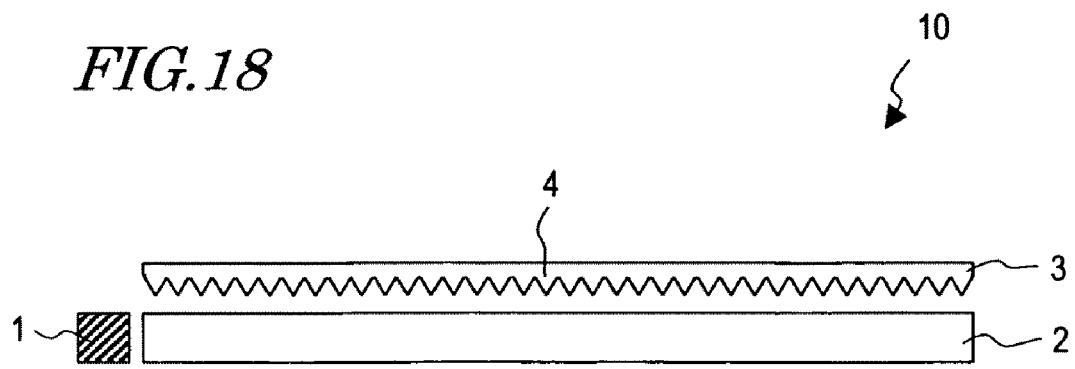
[FIG. 18] A side view showing an exemplary illuminator (backlight) included in the liquid crystal display devices 100, 100A, and 100B.

Next, the specific construction of the illuminator (backlight) 10 will be described. FIG. 18 shows an exemplary specific construction of the illuminator 10.

The illuminator 10 shown in FIG. 18 includes a light source 1 and a light guide plate 2 for guiding the light emitted from the light source 1 to the liquid crystal display panel 20. The light source 1 is a light-emitting diode (LED) or a cold-cathode tube, for example. In the light guide plate 2, structures for allowing light which has been emitted from the light source 1 and entered inside the light guide plate 2 to go out toward the liquid crystal display panel 20 side are formed. For example, on at least one of the two principal faces of the light guide plate 2, prisms or grain is formed.

Furthermore, the illuminator 10 includes a prism sheet 3 for controlling the directivity of light going out from the light guide plate 2. The prism sheet 3 functioning as a directivity controlling element is provided between the light guide plate 2 and the liquid crystal display panel 20.

Figure 19:
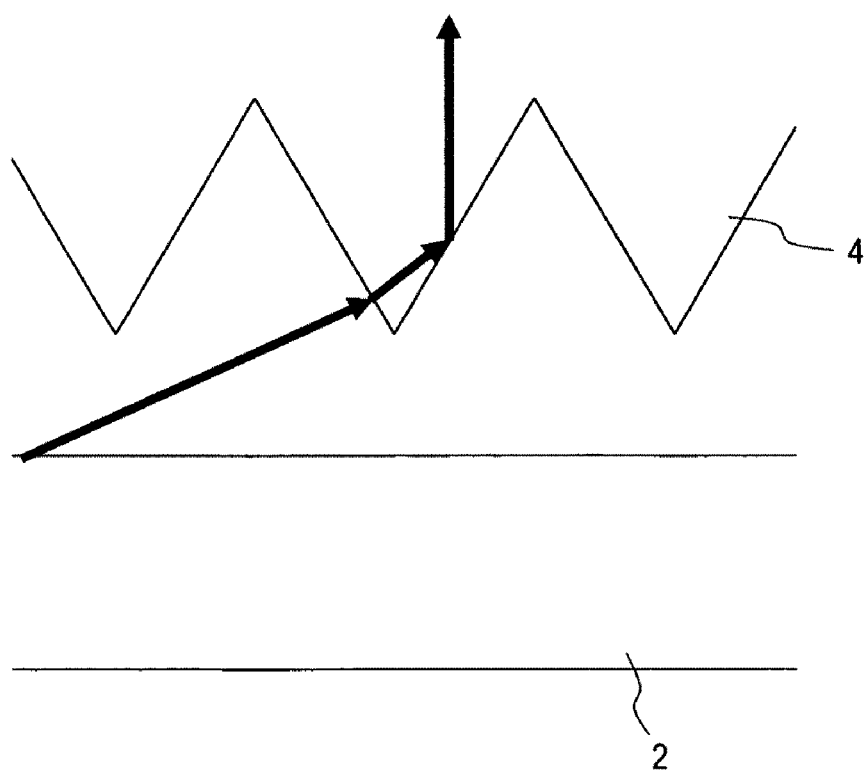
[FIG. 19] A diagram for explaining a function of a prism sheet included in the illuminator shown in FIG. 18.

The prism sheet 3 includes a plurality of prisms 4 formed on its principal face closer to the light guide plate 2, and as shown in FIG. 19, directs the light going out from the light guide plate 2 in the display surface normal direction by utilizing a total reflection phenomenon. Thus, the prism sheet 3 imparts a high directivity to the light going out from the light guide plate 2.

It will be appreciated that, without limitation to what is exemplified in FIG. 18, various backlights can be used as the illuminator 10. However, in order to obtain a higher contrast ratio, it is preferable to use that which is able to emit light with a higher directivity. Specifically, when the illuminator 10 has an intensity distribution such that the luminance in directions at an angle of 30° or more with respect to the display surface normal direction is 3% or less of the luminance in the display surface normal direction, a sufficiently high contrast ratio can be easily realized.

Figure 20:
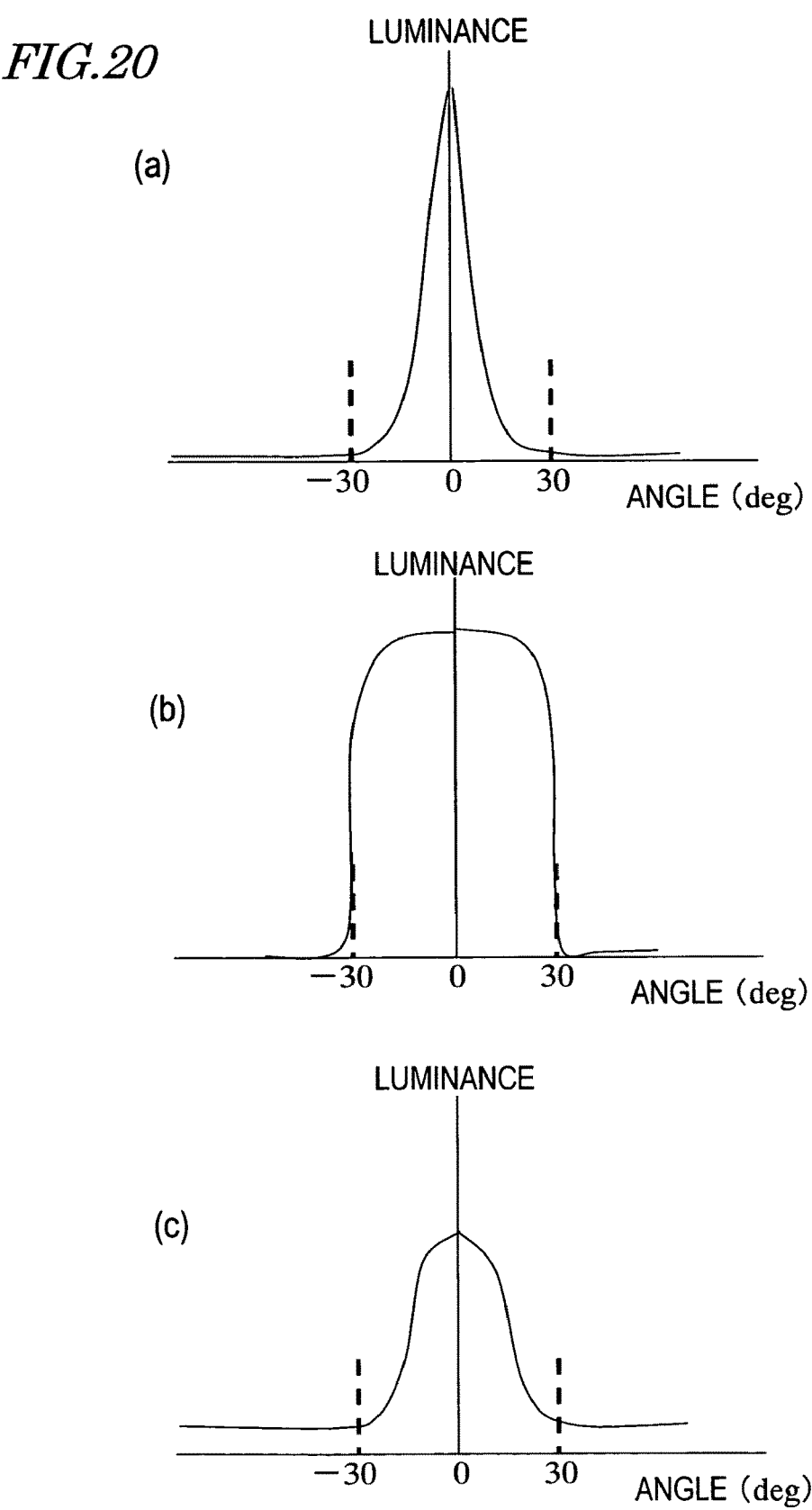
[FIGS. 20](a), (b), and (c) are graphs showing exemplary intensity distributions of light emitted from an illuminator.
Figure 21:
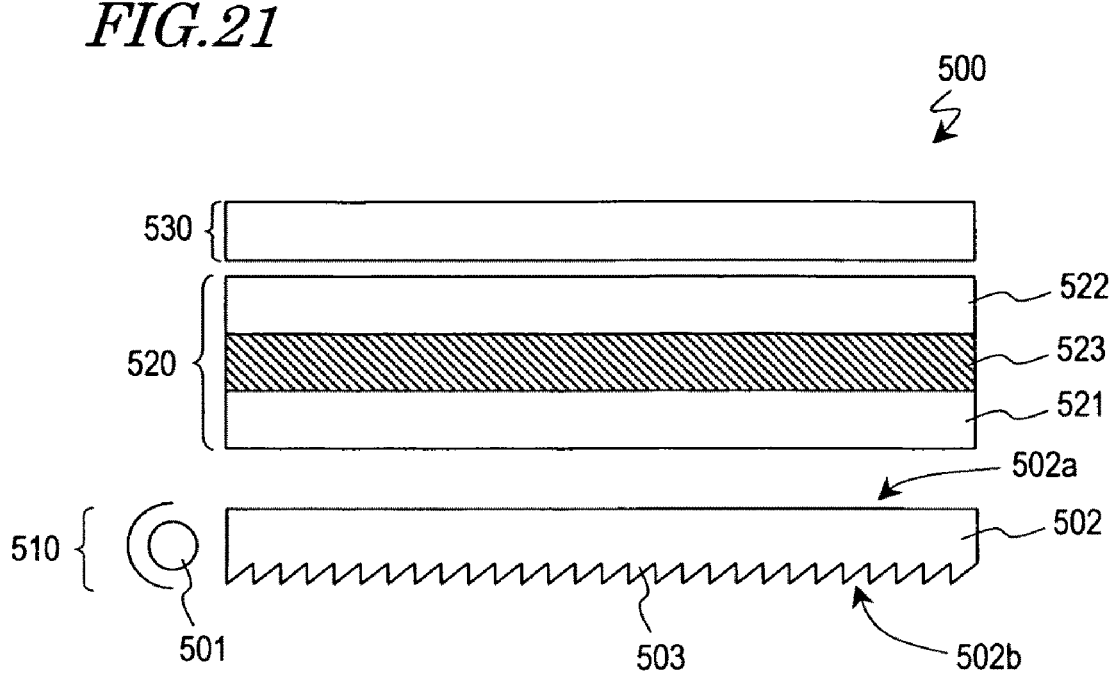
[FIG. 21] A cross-sectional view schematically showing a conventional liquid crystal display device 500.

FIGS. 20(a) and (b) show preferable examples of intensity distribution of the illuminator 10. In the intensity distribution shown in FIG. 20(a), the luminance is highest in the display surface normal direction, and the luminance rapidly lowers as the angle increases. On the other hand, in the intensity distribution shown in FIG. 20(b), a relatively high luminance is maintained from the display surface normal direction to near 30°. In both of the intensity distributions shown in FIGS. 20(a) and (b), the luminance in directions at an angle of 30° or more with respect to the display surface normal direction is 3% or less of the luminance in the display surface normal direction (0°). Therefore, by using illuminators 10 having such intensity distributions, an excellent display quality can be obtained.

Another exemplary intensity distribution is shown in FIG. 20(c). In the intensity distribution shown in FIG. 20(c), the luminance in directions at an angle of 30° or more with respect to the display surface normal direction is equal to or less than 8% to 13% of the luminance in the display surface normal direction (0°). Even in the case of using an illuminator 10 having such an intensity distribution, a sufficient excellent display quality can be obtained by appropriately selecting an optical modulation pattern (i.e., shape of the contrast cone) by the optical modulation section (the liquid crystal layer 23 and the phase difference compensation elements 50a and 50b).

Table 1 shows suitability of combinations of the intensity distributions shown in FIGS. 20(a), (b), and (c) (respectively referred to as intensity distributions A, B, and C) and the contrast cones shown in FIG. 15(a), FIG. 16(a), and FIG. 17(a) (respectively referred to as contrast cones A, B, and C). In Table 1, "○" indicates a better combination than "Δ", whereas "⊚" indicates a still better combination.

TABLE 1

|  | intensity distribution A | intensity distribution B | intensity distribution C |
|---|---|---|---|
| contrast cone A | ⊚ | ⊚ | Δ |
| contrast cone B | ⊚ | ⊚ | ○ |
| contrast cone C | ⊚ | ⊚ | ⊚ |

As can be seen from Table 1, the intensity distribution A shown in FIG. 20(a) and the intensity distribution B shown in FIG. 20(b) form very good combinations with any of contrast cones A, B, and C. It can also be seen from Table 1 that the intensity distribution C shown in FIG. 20(c) prefers combination with contrast cone B over contrast cone A, and further prefers combination with contrast cone C.

As can be seen from the above, in order to suitably perform optical modulation, it is preferable that the crest portion of the intensity distribution (the high luminance portion) of the illuminator 10 essentially coincides with the contrast cone (i.e., the angle range indicated by the contrast cone) or fits within the contrast cone. If the crest portion of the intensity distribution extends outside of the contrast cone, optical modulation may not be suitably performed.

The level of directivity shown in FIG. 20(c) can be easily realized by using an illuminator 10 having the total-reflection type prism sheet 3 shown in FIG. 18, for example. The levels of directivity of FIGS. 20(a) and (b) can be realized by using the backlights disclosed in the specification of U.S. Pat. No. 5,949,933 and in the specification of U.S. Pat. No. 5,598,281. The specification of U.S. Pat. No. 5,949,933, supra, discloses an edge light type backlight, in which lenticular microprisms are provided on the principal face of a light guide plate. The specification of U.S. Pat. No. 5,598,281, supra, discloses a direct type backlight in which light having been emitted from a light source is allowed to enter microcollimators and microlenses via apertures.

Moreover, the contrast cones A, B, and C shown in FIG. 15(a), FIG. 16(a), and FIG. 17(a) can be realized by combinations between liquid crystal layers for known display modes and known phase difference plates. The contrast cone shown in FIG. 15(a) can be realized by combining, for example, an STN mode liquid crystal layer with a phase difference plate NRF manufactured by NITTO DENKO CORPORATION (having an Nz factor of 1.0). The contrast cone shown in FIG. 16(a) can be realized by combining, for example, an STN mode liquid crystal layer with a phase difference plate NRZ manufactured by NITTO DENKO CORPORATION (having an Nz factor of 0.5 to 0.8). The contrast cone shown in FIG. 17(a) can be realized by, for example, combining an STN mode liquid crystal layer with a phase difference plate NRZ manufactured by NITTO DENKO CORPORATION (having an Nz factor of 0 to 0.4). Note that the Nz factor is one of indices representing the relative magnitudes of refractive index components nx, ny, nz of a phase difference plate.

INDUSTRIAL APPLICABILITY

According to the present invention, it is possible to realize a desired luminance distribution and perform display with a high contrast ratio across a broad angle range, in a liquid crystal display device having a light diffuser. The present invention is suitably used for transmission-type liquid crystal display devices in general, and in particular, suitably used for liquid crystal display devices of display modes of poor viewing angle characteristics (e.g., STN mode, TN mode, ECB mode).

In display modes utilizing birefringence, e.g., the STN mode, there is a large unfavorable influence on displaying due to light which obliquely enters the liquid crystal layer, thus making it preferable to employ a viewing angle enlarging technique where highly directive light is allowed to enter a liquid crystal layer and light having been modulated by the liquid crystal layer is diffused by a light diffuser, thus leading to a large significance in applying the present invention.

The invention claimed is:

1. A liquid crystal display device comprising:
   a light source;
   a liquid crystal display panel for modulating light emitted from the light source; and
   a light diffuser being disposed at a viewer's side of the liquid crystal display panel and diffusing light traveling through the liquid crystal display panel, wherein,
   the light diffuser is a prism sheet including a plurality of prisms; and
   each of the plurality of prisms has: a first prism section including a first slope slanted at a first angle with respect to a display surface normal direction; and a second prism section including a second slope slanted with respect to the display surface normal direction at a second angle which is different from the first angle and being disposed at the viewer's side of the first prism section.

2. The liquid crystal display device of claim 1, wherein each of the plurality of prisms further includes a third prism section including a third slope slanted with respect to the display surface normal direction at a third angle which is different from the second angle and being disposed at the viewer's side of the second prism section.

3. The liquid crystal display device of claim 1, wherein each of the plurality of prisms has a top surface which is substantially perpendicular to the display surface normal direction.

4. The liquid crystal display device of claim 1, comprising a first polarizer disposed at the viewer's side of the light diffuser.

5. The liquid crystal display device of claim 4, further comprising a second polarizer disposed between the liquid crystal display panel and the light diffuser, wherein,
 a transmission axis of the first polarizer and a transmission axis of the second polarizer are substantially parallel.

6. The liquid crystal display device of claim 4, further comprising a third polarizer disposed at a side of the liquid crystal display panel opposite from the viewer's side.

7. The liquid crystal display device of claims 1, wherein, the light diffuser diffuses light entering at an angle within a specific angle range more strongly than light entering at any other angle;
 the specific angle range in a first plane parallel to the display surface normal direction differs from the specific angle range in a second plane display surface parallel to the normal direction and intersecting the first plane; and
 given the specific angle range A in the first plane, the specific angle range B in the second plane, a viewing angle range C in the first plane where the liquid crystal display panel has a contrast ratio of 1 or more, and a viewing angle range D in the second plane where the liquid crystal display panel has a contrast ratio of 1 or more,
 a ratio A/B between the specific angle range A in the first plane and the specific angle range B in the second plane is substantially equal to a ratio C/D between the viewing angle range C in the first plane and the viewing angle range D in the second plane.

8. The liquid crystal display device of claim 7, wherein the specific angle range A in the first plane is substantially equal to or narrower than the viewing angle range C in the first plane, and the specific angle range B in the second plane is substantially equal to or narrower than the viewing angle range D in the second plane.

9. The liquid crystal display device of claim 7, wherein each of the plurality of prisms has a different shape on a cross section parallel to the first plane from a shape on a cross section parallel to the second plane.

10. The liquid crystal display device of claim 1, comprising an illuminator including the light source.

11. The liquid crystal display device of claim 10, wherein the illuminator has an intensity distribution such that a luminance in directions at an angle of 30° or more with respect to the display surface normal direction is 13% or less of a luminance in the display surface normal direction.

12. The liquid crystal display device of claim 10, wherein the illuminator has an intensity distribution such that a luminance in directions at an angle of 30° or more with respect to the display surface normal direction is 3% or less of a luminance in the display surface normal direction.

13. The liquid crystal display device of claims 10, wherein the illuminator includes a directivity controlling element for controlling directivity of light emitted from the light source.

* * * * *